United States Patent
Cai et al.

(10) Patent No.: US 12,306,867 B2
(45) Date of Patent: May 20, 2025

(54) PRODUCTION METHOD OF MULTIMEDIA WORK, APPARATUS, AND COMPUTER-READABLE STORAGE MEDIUM

(71) Applicant: Lemon Inc., Grand Cayman (KY)

(72) Inventors: Xiaojuan Cai, Beijing (CN); Xuchen Song, Los Angeles, CA (US); Gen Li, Beijing (CN); Haoyuan Zhong, Los Angeles, CA (US); Weishu Mo, Beijing (CN); Hui Li, Beijing (CN)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 18/069,031

(22) Filed: Dec. 20, 2022

(65) Prior Publication Data

US 2023/0131850 A1 Apr. 27, 2023

Related U.S. Application Data

(63) Continuation of application No. PCT/SG2021/050470, filed on Aug. 11, 2021.

(30) Foreign Application Priority Data

Aug. 31, 2020 (CN) .......................... 202010901767.7

(51) Int. Cl.
*G06F 16/00* (2019.01)
*G06F 16/483* (2019.01)
(Continued)

(52) U.S. Cl.
CPC .......... *G06F 16/483* (2019.01); *G06F 16/683* (2019.01); *G06N 3/02* (2013.01)

(58) Field of Classification Search
CPC ...... G06F 16/483; G06F 16/683; G06F 16/14; G06F 16/432; G06F 16/438; G06F 18/00; G06F 16/433; G06N 3/02; H04N 21/44
See application file for complete search history.

(56) References Cited

U.S. PATENT DOCUMENTS 11,295,171 B2 * 4/2022 Lee .................. G06V 20/46
11,462,237 B2 * 10/2022 Yao .................. G10L 25/60
(Continued)

FOREIGN PATENT DOCUMENTS

CN 103793446 A 5/2014
CN 109068070 A 12/2018
(Continued)

OTHER PUBLICATIONS

International Search Report and Written Opinion in PCT/SG2021/050470, mailed Dec. 1, 2021, 14 pages.
(Continued)

*Primary Examiner* — Tuankhanh D Phan
(74) *Attorney, Agent, or Firm* — Astute IP Law Group

(57) ABSTRACT

A production method and device for multimedia work, and a computer-readable storage medium. The method includes: acquiring a target audio and at least one piece of multimedia information, calculating a matching degree between the target audio and the multimedia information, sorting the at least one piece of multimedia information according to the matching degree in a descending order, assigning top-ranking multimedia information as target multimedia information; calculating the image quality of each image in the target multimedia information, sorting every image of the target multimedia information according to image quality in a descending order, assigning the top-ranking images as target images; and synthesizing a multimedia work according to the target images and the target audio. The method allows the acquisition of high-definition multimedia work in which the video content and background music match with each other, and reduces the time cost and learning cost consumed by users in editing videos.

19 Claims, 5 Drawing Sheets

(51) Int. Cl.
  *G06F 16/683* (2019.01)
  *G06N 3/02* (2006.01)

(56) References Cited

U.S. PATENT DOCUMENTS

| | | | |
|---|---|---|---|
| 11,514,107 B2* | 11/2022 | Baijal | G06F 16/63 |
| 2009/0307207 A1* | 12/2009 | Murray | G06F 16/433 |
| | | | 707/999.005 |
| 2013/0089303 A1* | 4/2013 | Jiang | H04N 21/233 |
| | | | 386/285 |
| 2016/0066107 A1* | 3/2016 | Recker | H04R 25/505 |
| | | | 463/31 |
| 2017/0154450 A1 | 6/2017 | Wang | |
| 2017/0278546 A1* | 9/2017 | Xiao | H04N 5/911 |
| 2018/0176570 A1* | 6/2018 | Rippel | G06N 3/04 |
| 2020/0226179 A1 | 7/2020 | Novikoff et al. | |

FOREIGN PATENT DOCUMENTS

| | | |
|---|---|---|
| CN | 109964238 A | 7/2019 |
| CN | 110209844 A | 9/2019 |
| CN | 111191054 A | 5/2020 |
| CN | 111415677 A | 7/2020 |
| CN | 111494941 A | 8/2020 |
| JP | 2015012322 A | 1/2015 |
| JP | 7502553 B2 | 6/2024 |
| WO | 2020/034849 A1 | 2/2020 |

OTHER PUBLICATIONS

Bosse et al., "Deep Neural Networks for No. Reference and Full-Reference Image Quality Assessment," arXiv: 1612.01697v1, Cornell University Library, Dec. 6, 2016, pp. 1-12.
Extended European Search Report in EP21862207.4, mailed Sep. 8, 2023, 6 pages.
Guo et al., "Deep learning for visual understanding: A review," Neurocomputing, 2016, vol. 187, pp. 27-48.
Kotani et al., "Objective Picture Quality Scale by Neural INetwork Fed the Distortion Factors to the Input Layers", vol. J73-DII, No. 8, Aug. 1990, 7 pages.
Nakayama, "Image Feature Extraction and Transfer Learning Using Deep Convolutional Neural Networks", IEICE Technical Report; IEICE Tech. Rep., vol. 115, No. 146, 2015, 6 pages, with English Abstract.
Office Action received for Japanese Patent Application No. 2023-504467, mailed on Jan. 23, 2024, 9 pages.
First Office Action for Chinese Application No. 202010901767.7, mailed on Feb. 28, 2025, 20 pages.

\* cited by examiner (Part A)

PRODUCTION METHOD OF MULTIMEDIA WORK, APPARATUS, AND COMPUTER-READABLE STORAGE MEDIUM

The present application is a continuation of International Patent Application No. PCT/SG2021/050470, filed on Aug. 11, 2021, which claims priority of Chinese Patent Application No. 202010901767.7, filed on Aug. 31, 2020, and the entire content disclosed by the Chinese patent application is incorporated herein by reference as part of the present application.

TECHNICAL FIELD

Embodiments of the present disclosure relate to a production method of multimedia work, an apparatus, and a computer-readable storage medium.

BACKGROUND

It is known that short video applications are limited to recommending Professional Generated Content (PGC) music for a single video when performing intelligent audio and video recommendations. Because a selection range of the music is too wide, matching a music type of a music library according to a video label cannot meet a user's video scene picture fit, so that the user cannot select a desired piece of music from a music collection intelligently recommended by video. In addition, because there are often some noise clips in a video of the user's album, the user needs to elaborately craft, clip and edit very carefully so as obtain a multimedia work that may be posted, for example, a Music Video (MV), which increases time cost and technical threshold for creation.

SUMMARY

The embodiments of the present disclosure provide a production method of multimedia work, an apparatus, and a computer-readable storage medium that can overcome the above-described problems or at least partially solve the above-described problems.

In a first aspect, a production method of multimedia work is provided, the production method includes:
  acquiring a target audio and at least one piece of multimedia information, wherein the at least one piece of multimedia information comprises at least one selected from the group consisting of a picture or a video;
  determining a matching degree between the target audio and each of the at least one piece of multimedia information to obtain at least one matching degree, sorting the at least one piece of multimedia information in an order of the at least one matching degree from high to low, and taking a first preset number of pieces of multimedia information ranking in top order as target multimedia information;
  determining image quality of each picture in the target multimedia information, sorting each picture in the target multimedia information in an order of the image quality of each picture from high to low, and taking a second preset number of pictures ranking in top order as target pictures;
  synthesizing a multimedia work according to the target pictures and the target audio.

In a second aspect, a production apparatus of multimedia work is provided, the production apparatus includes:
  a material acquiring module, configured to acquire a target audio and at least one piece of multimedia information, wherein the at least one piece of multimedia information comprises at least one selected from the group consisting of a picture or a video;
  a matching module, configured to determine a matching degree between the target audio and each of the at least one piece of multimedia information to obtain at least one matching degree, sorting the at least one piece of multimedia information in an order of the at least one matching degree from high to low, and taking a first preset number of pieces of multimedia information ranking in top order as target multimedia information;
  a target picture acquiring module, configured to determine image quality of each picture in the target multimedia information, sort each picture in the target multimedia information in an order of the image quality of each picture from high to low, and take a second preset number of pictures ranking in top order as target pictures; and
  a music synthesizing module, configured to synthesize a multimedia work according to the target pictures and the target audio.

In a third aspect, the embodiment of the present disclosure provides an electronic device, the electronic device includes a memory, a processor, and a computer program stored on the memory and executable on the processor, the processor, when executing the computer program, implements the steps of the production method of multimedia work as described in the first aspect.

In a fourth aspect, the embodiment of the present disclosure provides a computer-readable storage medium, a computer instruction is stored on the computer-readable storage medium, the computer instruction, when executed by a processor, implements the steps of the production method of multimedia work as described in the first aspect.

In the production method of multimedia work, the apparatus, and the computer-readable storage medium provided by the embodiments of the present disclosure, acquiring a target audio and at least one piece of multimedia information, calculating a matching degree between the target audio and the multimedia information, to obtain target multimedia information matching with the target audio, so as to ensure that pictures to be further screened subsequently are all materials matching with the target audio. And then, calculating the image quality of each picture in the target multimedia information, selecting a picture with high image quality from the target multimedia information, synthesizing the picture with the high image quality and the target audio into a multimedia work, thereby obtaining the high-quality multimedia work whose image content matches with the background music, and reducing the time cost and learning cost consumed by users in clipping and editing a video.

BRIEF DESCRIPTION OF THE DRAWINGS

In order to more clearly explain the embodiments of the present disclosure, the following will briefly introduce the drawings that need to be used in the description of the embodiments.

DETAILED DESCRIPTION

Figure 1:
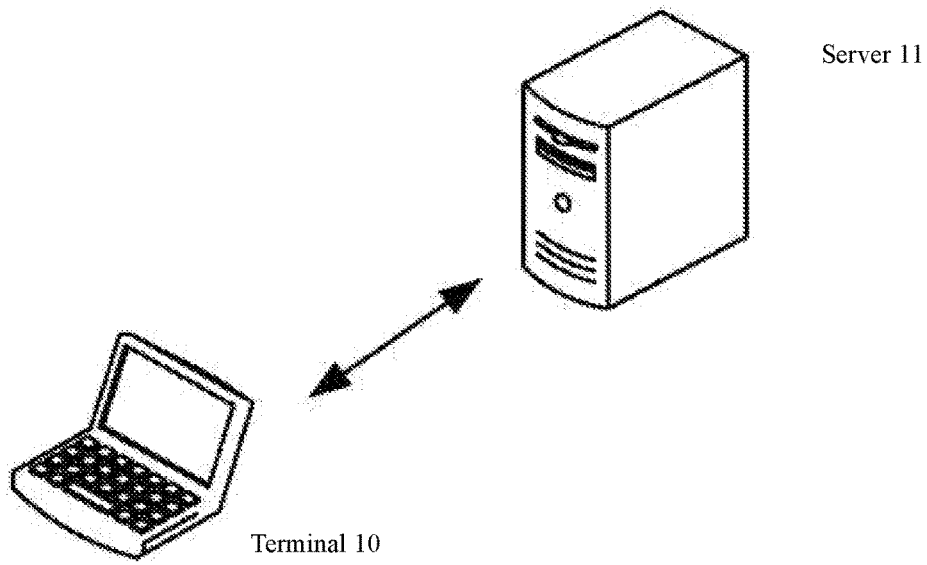
FIG. 1 is a structural schematic diagram of a production system for multimedia work provided by an embodiment of the present disclosure.

The embodiments of the present application are described in detail below, examples of which are shown in the accompanying drawings, in which the same or similar reference numerals indicate the same or similar elements or elements with the same or similar functions throughout. The embodiments described below with reference to the drawings are exemplary and are only used to explain the application, but not to limit the invention.

Those skilled in the art can understand that the singular forms "a", "an" and "the" used here can also include plural forms unless specifically stated. It should be further understood that the word "comprising" used in the specification of this application refers to the presence of features, integers, steps, operations, elements and/or components, but does not exclude the presence or addition of one or more other features, integers, steps, operations, elements, components and/or groups thereof. It should be understood that when we say that an element is "connected" or "coupled" to another element, it may be directly connected or coupled to other elements, or intervening elements may also exist. In addition, as used herein, "connected" or "coupled" may include wireless connection or wireless coupling. The expression "and/or" used here includes all or any unit and all combinations of one or more associated listed items.

In order to make the object, technical scheme and advantages of this application clearer, the embodiments of this application will be described in further detail below with reference to the accompanying drawings.

The production method of multimedia work, an apparatus, an electronic device and a computer-readable storage medium provided by the present application aim to solve the above technical problems of the prior art.

The technical scheme of the present application and how the technical scheme of the present application solves the above technical problems are explained in detail with specific examples below. The following specific embodiments can be combined with each other, and the same or similar concepts or processes may not be described in detail in some embodiments. Embodiments of the present application will be described below with reference to the drawings.

The embodiments of the present disclosure provide a production method of multimedia work, an apparatus, an electronic device and a storage medium. Specifically, the embodiments of the present disclosure provide a production method of multimedia work applicable to the electronic device; and the electronic device may be a device such as a terminal or a server, etc.

It may be understood that the production method of multimedia work according to this embodiment may be executed on the terminal, may be executed on the server, or may also be jointly executed by the terminal and the server.

Referring to FIG. 1, the production method of multimedia work jointly executed by the terminal and the server is taken as an example. The production system for multimedia work provided by the embodiment of the present disclosure includes a terminal 10, a server 11, etc.; the terminal 10 and the server 11 are connected with each other through a network, for example, through a wired or wireless network, wherein a background music constructing apparatus may be integrated in the server.

The terminal 10 may acquire a target audio and at least one piece of multimedia information that needs to be set with background music through an inputting module, and send the background music and the multimedia information to the server 11, so that the server 11 may calculate a matching degree between the target audio and the at least one piece of multimedia information, select target multimedia information according to the matching degree, and determine a plurality of frames of pictures with high image quality as target pictures from the target multimedia information, synthesize a multimedia work according to the target pictures and the target audio, and then return the multimedia work to the terminal for viewing by a terminal user. The terminal 10 may include a mobile phone, a smart television, a tablet personal computer, a notebook computer, or a Personal Computer (PC), etc. The terminal 10 may also be provided with a client terminal, and the client terminal may be an application client terminal or a browser client terminal, etc., for the user to select background music matching with the target video.

The server 11 may be configured to: acquire a target audio and at least one piece of multimedia information; determine a matching degree between the target audio and each of the at least one piece of multimedia information, sort the at least one piece of multimedia information in a descending order of the matching degree(s), and take the first preset number of pieces of multimedia information ranking in the top order as target multimedia information; determine image quality of each picture in the target multimedia information, sort each picture in the target multimedia information in a descending order of image quality, and take the second preset number of pictures ranking in the top order as target pictures; synthesize the target pictures into a video file; synthesize the music into the video file as background music to obtain a multimedia work, and then send the multimedia work to the terminal 10. The server 11 may be a single server, or may also be a server cluster composed of a plurality of servers.

The above-described process of setting the background music by the server 11 may also be executed by the terminal 10.

The production method of multimedia work provided by the embodiment of the present disclosure relates to Video Content Understanding in a field of Artificial Intelligence (AI). In the embodiment of the present disclosure, the target multimedia information with a high matching degree may be selected according to the matching degree between the target audio and the multimedia information, then the pictures with high image quality are selected from the target multimedia information as the target pictures, and the target pictures and the music are synthesized into a video file having background music, which is favorable for improving efficiency of acquiring the multimedia information matching with the background music, meanwhile, can improve correlation between the background music and the target multimedia information, and can obtain a multimedia work with high image quality, resulting in a better display effect.

Artificial Intelligence (AI) is a theory, method, technology and application system that uses digital computers or machines controlled by digital computers to simulate, extend and expand human intelligence, perceive environment, acquire knowledge and use knowledge to obtain best results. In other words, artificial intelligence is a comprehensive technology of computer science; it is intended to understand essence of intelligence and produce a new intelligent machine that can respond in a similar way to human intelligence. Artificial intelligence is study of design principles and implementation methods of various intelligent machines, so that the machines have functions of perception, reasoning and decision-making. The artificial intelligence technology is a comprehensive discipline, involving a wide range of fields, having both hardware level technology and software level technology. The artificial intelligence software technology mainly includes directions such as computer vision technology, voice processing technology, natural language processing technology, and machine learning/deep learning, etc.

Video content understanding uses a series of AI algorithms to parse a video into structured, machine-readable intent and word slot information, the study of which affects face recognition, motion recognition, object detection, media production, video recommendation, and other aspects.

The embodiments of the present disclosure will be described from a perspective of a production apparatus of multimedia work; the production apparatus of multimedia work may be specifically integrated in an electronic device; and the electronic device may be a server, a terminal, or other device.

The production method of multimedia work according to the embodiment of the present disclosure may be applied to various scenarios where a multimedia work needs to be created; for example, when a user posts a video on a short video platform, the method provided by this embodiment can quickly find the multimedia content matching with the obtained user's favorite piece of music and produce a multimedia work with high image quality.

Figure 2:
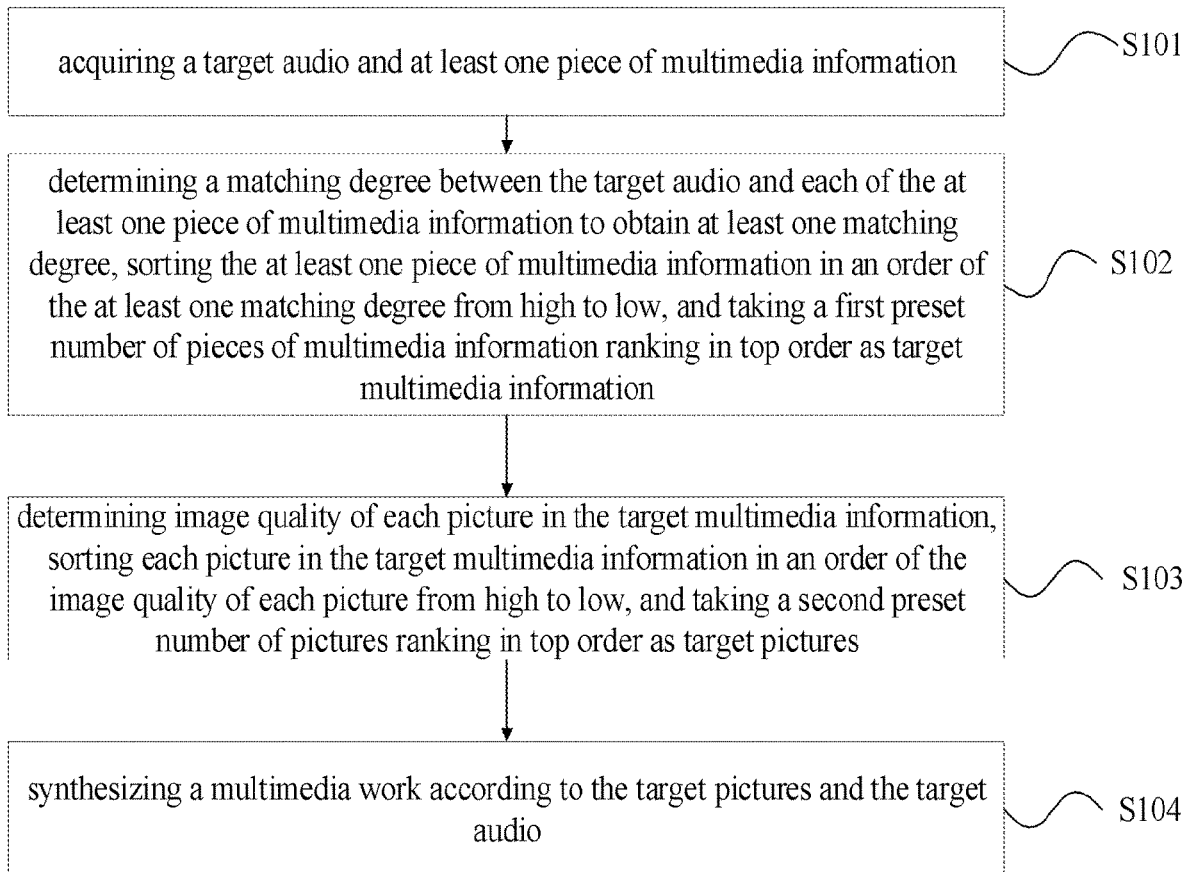
FIG. 2 is a schematic flow chart of a production method of multimedia work provided by an embodiment of the present disclosure.

The embodiment of the present disclosure provides a production method of multimedia work, and as shown in FIG. 2, the method includes:

S101: acquiring a target audio and at least one piece of multimedia information, and the at least one piece of multimedia information includes at least one selected from the group consisting of a picture or a video.

The target audio acquired by the present disclosure is the favorite music of the user, the target audio may be either vocal music or pure music, and may be music downloaded by the user through music playing software, or music created by the user himself/herself. The type and source of the music are not limited in the present disclosure. In the present disclosure, in order to create a video suitable for taking the target audio as the background music, firstly, at least one piece of multimedia information needs to be acquired; and the multimedia information may be a picture or a video. The multimedia information may be acquired from an album of a user terminal, so as to create a video by using the multimedia information captured by the user himself/herself; of course, the multimedia information may also not be captured by the user himself/herself; and sources of multimedia information are not limited in the present disclosure.

S102: determining a matching degree between the target audio and each of the at least one piece of multimedia information to obtain at least one matching degree, sorting the at least one piece of multimedia information in an order of the at least one matching degree from high to low, and taking a first preset number of pieces of multimedia information ranking in top order as target multimedia information.

In the present disclosure, calculating the matching degree between the target audio and each piece of multimedia information, choosing several pieces of multimedia information with high matching degree as the target multimedia information. In the present disclosure, when calculating the matching degree, determining the theme of the target audio and the theme of the multimedia information, then taking multimedia information with a matching theme as the target multimedia information; when determining the theme of the target audio, if the target audio is public music, the theme may be determined by retrieving information such as introduction and evaluation of the music on the Internet; the determined theme may be a theme such as love, country music, rock, negative, positive, etc.; while with respect to the multimedia information, the theme may be determined by using a video content understanding algorithm, and then the multimedia information with a same theme as the target audio may be taken as the target multimedia information.

S103: determining image quality of each picture in the target multimedia information, sorting each picture in the target multimedia information in an order of the image quality of each picture from high to low, and taking a second preset number of pictures ranking in top order as target pictures.

In the present disclosure, after determining the target multimedia information, further determining the image quality of each picture in the target multimedia information. It should be understood that if a certain piece of target multimedia information is a picture, then determining the image quality of the picture; and if a certain piece of target multimedia information is a video, then each picture of the video is each frame of the video. In the present disclosure, the second preset number is not greater than the first preset number.

In the present disclosure, the image quality may be characterized by scoring results from the dimensions such as the image clarity, whether there are people, and whether the image is distorted, etc. The higher the score, the higher the image quality. In the present disclosure, highlight clips in each piece of target multimedia information may be obtained by acquiring pictures with high image quality. Further, by obtaining sample pictures having image quality scoring results in advance, training a neural network model with the sample pictures, and predicting image quality of each picture in the target multimedia information by using the neural network model having been trained, efficiency of computing the image quality may be greatly improved.

S104: synthesizing a multimedia work according to the target pictures and the target audio.

By splicing the target pictures (that is, highlight clips in each piece of target multimedia information) according to display number and display time, obtaining a video file composed of the highlight clips. For example, setting display number and display time for each target picture, and displaying the target pictures sequentially according to the display number and display time of each target picture, to obtain a video file. For example, there are two target pictures, display time of the first target picture is set to 30 seconds, and display time of the second target picture is set to 30 seconds, then the two target pictures may be synthesized into a 1-minute video file. The highlight clip is a clip at a highlight moment, and the highlight moment means a wonderful moment, which comes from the English word highlight. The target audio is further synthesized into the video file as the background music, so as to obtain the multimedia work with high image quality that has the image content matching with the background music.

In the present disclosure, by acquiring the target audio and the at least one piece of multimedia information, and by calculating the matching degree between the target audio and the multimedia information, obtaining the target multimedia information matching with the target audio, so as to ensure that pictures to be further screened subsequently are all materials matching with the target audio. And then, calculating image quality of each picture in the target multimedia information, selecting pictures with high image quality from the target multimedia information, synthesizing the pictures with high image quality to obtain a video file, and finally synthesizing the target audio into the video file as the background music, so that the multimedia work with high image quality that has the image content matching with the background music may be obtained, which reduces time cost and learning cost of a user in clipping and editing the video.

On the basis of the above-described respective embodiments, as an optional embodiment, the synthesizing a multimedia work according to the target pictures and the target audio, includes:

Selecting a third preset number of pictures from the target pictures to be synthesized with the target audio, to obtain a multimedia work.

Specifically, in the present disclosure, the third preset number of pictures may be randomly selected from the target pictures for synthesis; or the target pictures may be randomly arranged for subsequent random selection; and a mode of selecting pictures are not limited in the present disclosure.

In the embodiment of the present disclosure, the multimedia work is obtained by selecting the third preset number of pictures from the target pictures for synthesis, which can avoid generating multimedia works with repeated pictures when the same target audio and the same batch of multimedia information are used to generate multimedia works many times, thus enhancing the characteristics of personalization and diversification.

On the basis of the above-described respective embodiments, as an optional embodiment, the determining the matching degree between the target audio and each of the at least one piece of multimedia information, includes:

S201: acquiring an audio feature of the target audio, inputting the audio feature into an audio understanding model that is pre-trained, and obtaining an audio understanding feature of the target audio output by the audio understanding model.

In the present disclosure, the audio feature, as acquired by using a signal processing method, includes, for example, zero crossing rate, short-term energy, fundamental frequency, amplitude, sound width, and sound intensity, etc.; the audio feature does not have understanding information; and by inputting the audio feature into the audio understanding model that is pre-trained, the audio understanding feature of the target audio may be acquired.

It should be understood that the audio understanding model may also be trained in advance before S201 is executed; specifically, the audio understanding model may be trained by using a method below: firstly, collecting a certain number of pieces of sample music, acquiring an audio feature of each piece of sample music, determining a music type of each piece of sample music, and then, training an initial model based on the audio feature of the sample music and the music type of the sample music, so as to obtain the audio understanding model. The initial model may be a single neural network model or a combination of a plurality of neural network models. The audio understanding model may obtain the audio understanding feature according to the input audio feature, and further predict the music type according to the audio understanding feature, so as to obtain the audio understanding feature of the target audio output from the audio understanding model after the audio feature of the target audio is input.

S202: performing frame extraction on the multimedia information, inputting a frame extraction result into the video understanding model that is pre-trained, and obtaining a video understanding feature of the multimedia information output by the video understanding model.

It should be understood that, with respect to picture-category multimedia information, the frame extraction result is the picture per se, and with respect to video-category multimedia information, the frame extraction result is a plurality of frames of pictures of the video.

Before S202 is executed, the video understanding model may also be trained in advance; specifically, the video understanding model may be trained by using a method below: firstly, collecting a certain number of pieces of sample multimedia information, acquiring a frame extraction result of each piece of sample multimedia information, determining a theme of each piece of sample multimedia information, and then, training an initial model based on the frame extraction result of the sample multimedia information and the theme of the sample multimedia information, so as to obtain the video understanding model. The initial model may be a single neural network model or a combination of a plurality of neural network models. The video understanding model may obtain the video understanding feature according to the input frame extraction result, and further predict the theme according to the video understanding feature, so as to obtain the video understanding feature of the multimedia information output by the video understanding model, after the frame extraction result of the multimedia information is input.

S203: inputting the video understanding feature of each of the at least one piece of multimedia information and the audio understanding feature into a matching model that is pre-trained, to obtain a matching degree between the audio understanding feature and each video understanding feature output by the matching model, as at least one matching degree between the target audio and the at least one piece of multimedia information.

It should be understood that the matching model may also be trained in advance before S203 is executed; specifically, the matching model may be trained by using a method below: firstly, collecting a certain number of pieces of sample music and sample multimedia information, acquiring an audio understanding feature of each piece of sample music and a video understanding feature of each sample multimedia information, determining a matching degree between each piece of sample music and each sample multimedia information, and then, training an initial model based on the audio understanding feature of the sample music, the video understanding feature of the sample multimedia information, and the matching degree between the sample music and the sample multimedia information, so as to obtain the matching model, wherein, the initial model may be a single neural network model, or a combination of a plurality of neural network models.

In the embodiment of the present disclosure, the audio understanding feature of the target audio is obtained through the audio understanding model, the video understanding feature of the multimedia information is obtained through the video understanding model, and finally the matching degree between the target audio and the multimedia information is obtained through the matching model. Because the whole process is implemented based on the neural network model, efficiency and accuracy of implementation are greatly improved as compared with manual matching.

On the basis of the above-described respective embodiments, as an optional embodiment, the audio understanding model includes a first feature extraction layer and a first classification layer.

Further, the training method of the audio understanding model includes:

S301: initializing parameters of the first feature extraction layer and the first classification layer;

S302: taking a certain number of pieces of sample music as training samples, for each training sample, taking a music type of the training sample as a sample label, inputting the training sample and the sample label into the first feature extraction layer, and obtaining an audio understanding feature of the training sample output by the first feature extraction layer.

S303: inputting the audio understanding feature of the training sample into the first classification layer, to obtain a prediction result of the music type of the training sample output by the first classification layer.

S304: calculating a deviation between the prediction result and the sample label corresponding to the training sample, and adjusting the parameters of the first feature extraction layer and the first classification layer through reverse feedback, until a convergence degree of the deviation is less than a preset threshold, so as to obtain the audio understanding model having been trained.

The audio understanding model according to the present disclosure may be set according to actual needs, and a Back Propagation (BP) neural network is used in this embodiment. The BP network is a multilayer feedforward network trained by using an error back propagation algorithm. A learning rule of the BP neural network is to use a steepest descent method to continuously adjust weights and the threshold of the network through back propagation, so as to minimize a square sum of errors of the network. A topological structure of the BP neural network model includes an input layer, a hide layer and an output layer. In the present disclosure, the input layer and the hide layer are taken as the first feature extraction layer, and the output layer is taken as the first classification layer.

A basic training idea of the BP neural network is to use the steepest descent method to minimize a square sum of errors between an actual output value and an expected output value of the neural network. A learning process is divided into forward propagation and backward propagation. Forward propagation refers to that input data will pass through the input layer and the hide layer in a layer-by-layer manner and finally an output value is obtained at the output layer. However, if the output value of the network is not as expected, back propagation will be enabled and the error will be propagated back along respective layers; and during propagation, weights of a connection layer will be corrected to make an error of a next round of forward propagation smaller and finally reach a minimum value.

On the basis of the above-described respective embodiments, the obtaining the audio understanding feature of the music output by the audio understanding model, includes: inputting the music into the audio understanding model, and obtaining the audio understanding feature of the music output by the first feature extraction layer of the audio understanding model.

On the basis of the above-described respective embodiments, as an optional embodiment, the video understanding model is obtained by transfer learning in the process of training the video understanding model in the present disclosure. Transfer Learning is a machine learning method that takes a model developed for task A as an initial point and reuses the same in a process of developing a model for task B.

Specifically, the training method of the video understanding model according to the present disclosure includes:

S401: transferring an initial model that has been trained, and adjusting a parameter and a structure of the initial model in combination with a frame extraction result of sample multimedia information, to obtain a transfer model.

In the present disclosure, the Inflated 3D Convnet (I3D) network pre-trained on a Kinetics-600 dataset may be taken as the initial model; Kinetics-600 is a large-scale, high-quality YouTube video website dataset, which contains various people-oriented actions. The dataset consists of about 500,000 video clips, covering 600 human motion categories, and each motion category has at least 600 video clips. Each clip lasts about 10 seconds and is labeled with a category. All clips are manually annotated in a plurality of rounds, and each clip is from a unique YouTube video. These motions cover a wide range of courses, including human-to-object interaction, for example, playing musical instruments, and human-to-human interaction, for example, shaking hands and hugging.

The I3D network extends convolution and a pooling kernel in a very deep image classification network from 2D to 3D, to seamlessly learn time-space features; and after the I3D network is pre-trained in Kinetics, accuracy of the I3D network in benchmark datasets HMDB-51 and UCF-101 has reached 80.9% and 98.0%. Therefore, in the present disclosure, the trained initial model (e.g., the I3D network) is applied to video content understanding. By combining the sample multimedia information, the relevant parameters and structure of the initial model is finely tuned, so as to achieve more accurate video content understanding.

S402: training the transfer learning model by using the back propagation method, according to the frame extraction result of the sample multimedia information and the theme of the sample multimedia information, and taking the trained transfer learning model as the video understanding model. Training Steps:

According to the Back propagation algorithm (BP algorithm), the transfer learning model is trained with the frame extraction result of the sample multimedia information and the theme of the sample multimedia information.

Figure 3:
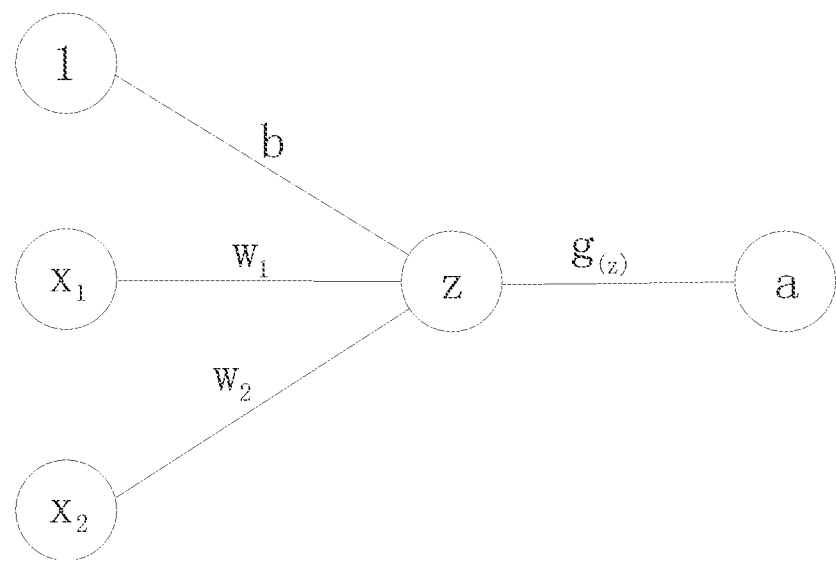
FIG. 3 is a structural schematic diagram of a single neural network provided by the embodiment of the present disclosure.

A structure of a single neural network may be as shown in FIG. 3, each circle represents a neuron, w1 and w2 represent weights between neurons, b represents a bias, g(z) is an activation function, so that output becomes nonlinear, a represents output, and x1 and x2 represent input; and then with respect to the current structure, the output may be expressed as formula (1). According to formula (1), when the input data and the activation function remain unchanged, the output value a of the neural network is related to the weights and the bias. By adjusting different weights and bias, the output of the neural network will have different results.

$$a = g(x1*w1 + x2*w2 + 1*b) \qquad (1)$$

Given that the output value (prediction value) of the neural network is a, assuming that an actual value corresponding thereto is a'.

With respect to FIG. 3, the back propagation algorithm thereof is executed as follows:
i. In the back propagation algorithm, firstly, weights (w1 and w2) and bias b of each connection line are randomly initialized;
ii. With respect to the input data x1 and x2, in the BP algorithm, forward propagation will be executed firstly to obtain the prediction value a;
iii. Then, according to an error E between the actual value a' and the prediction value a, reverse feedback is performed to update weight and bias of each connection line of each layer in the neural network;
iiii. Steps ii to iii are continuously repeated until the network converges, that is, the value of error E is the minimum or basically remains unchanged. At this moment, it indicates that the network has been trained well.

In the present disclosure, the initial model having been trained is used, to establish a video understanding model by transfer learning, so that the video understanding model may be adaptively applied to prediction of a video type, which reduces workload of acquiring the theme label of the sample multimedia information and improves execution efficiency of the algorithm.

On the basis of the above-described respective embodiments, as an optional embodiment, the video understanding model includes a second feature extraction layer and a second classification layer;

The training the transfer learning model by using the back propagation method, according to the frame extraction result of the sample multimedia information and the theme of the sample multimedia information, includes:

S501: initializing parameters of the second feature extraction layer and the second classification layer.

S502: taking the frame extraction result of the sample multimedia information as the training sample, taking the theme of the sample multimedia information as the sample label, inputting the training sample and the sample label into the second feature extraction layer, and obtaining a video understanding feature of the training sample output by the second feature extraction layer;

S503: inputting the video understanding feature of the training sample into the second classification layer to obtain a prediction result of the theme of the training sample output by the second classification layer;

S504: calculating a deviation between the prediction result and the sample label corresponding to the training sample, and adjusting the parameters of the second feature extraction layer and the second classification layer through reverse feedback, until a convergence degree of the deviation is less than a preset threshold, so as to obtain the transfer learning model having been trained.

On such basis, inputting a frame extraction result into the video understanding model that is pre-trained, and obtaining a video understanding feature of the multimedia information output by the video understanding model, includes: inputting the frame extraction result into the video understanding model, to obtain the video understanding feature of the multimedia information output by the second feature extraction layer of the video understanding model.

On the basis of the above-described respective embodiments, calculating image quality of each picture in the target multimedia information, includes:

inputting the target picture into the pre-trained image quality prediction model, to obtain an image quality of the target picture output by the image quality prediction model.

As an optional embodiment, the method for training the image quality prediction model includes:
initializing a parameter of the image quality prediction model;
taking a certain number of sample pictures as training samples, and taking an image quality score of each sample picture as a sample label;
inputting the training sample into the image quality prediction model, to obtain a prediction result of the image quality score of the training sample output by the image quality prediction model;
calculating a deviation between a first difference and a second difference, and the first difference is a difference between prediction results of image quality scores of any two training samples, and the second difference is a difference between sample labels corresponding to the any two training samples; adjusting the parameter of the image quality prediction model through reverse feedback, until a convergence degree of the deviation is less than a preset threshold, so as to obtain the image quality prediction model having been trained.

The image quality prediction model according to the present disclosure may adopt Convolutional Neural Network (CNN), and further, may adopt a mobilenet neural network. The mobilenet neural network is a kind of CNN, belongs to a lightweight neural network, and is widely applied in target detection, classification, tracking, and many other fields.

In the present disclosure, when calculating the deviation, a difference between the prediction results of the image quality scores of two training samples are considered, which, as compared with a prediction result of an image quality score of a single training sample, may make image quality prediction converge faster.

Figure 4A:
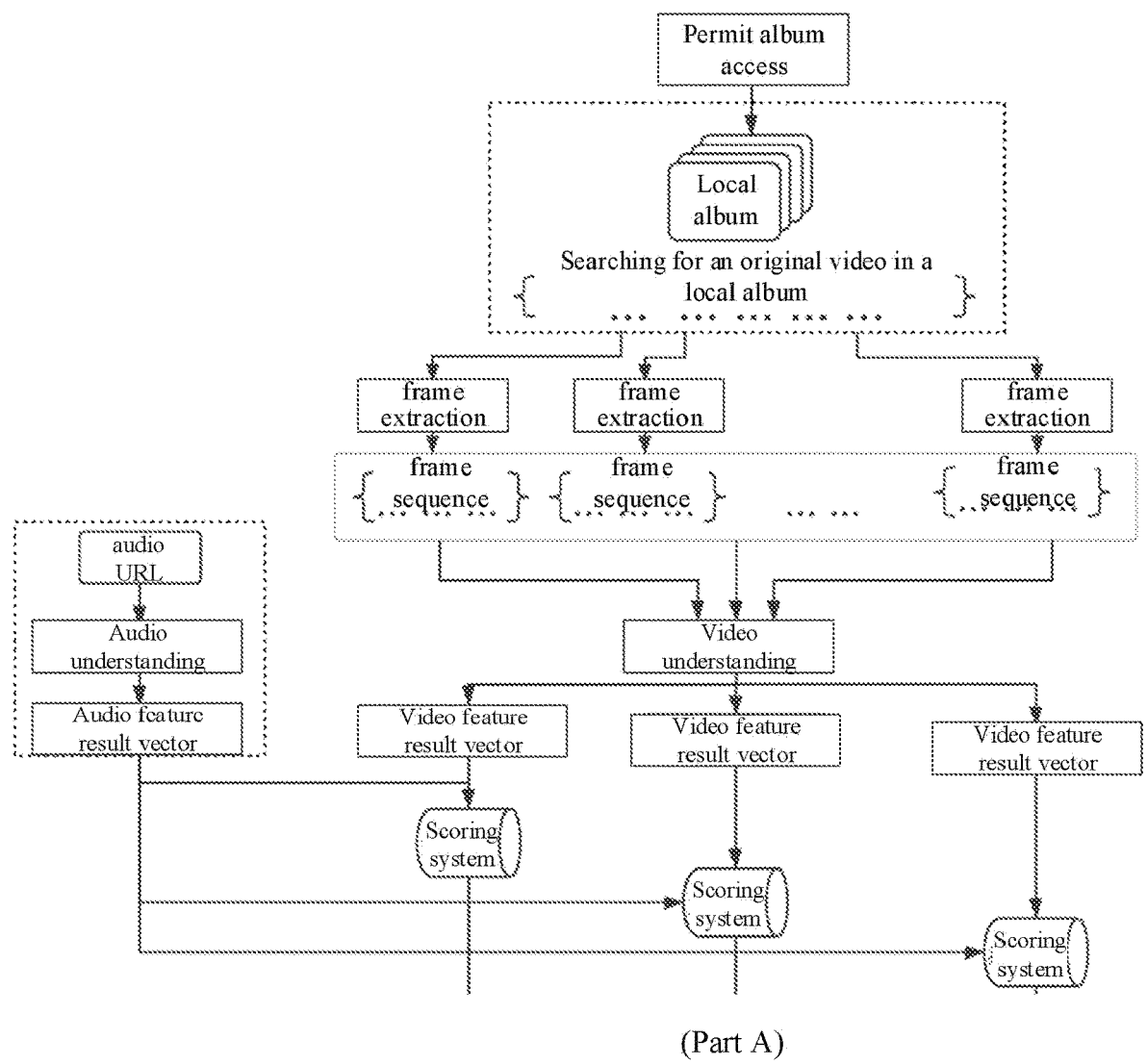
FIG. 4A and FIG. 4B are schematic flow charts of a production method of multimedia work provided by another embodiment of the present disclosure.
Figure 4B:
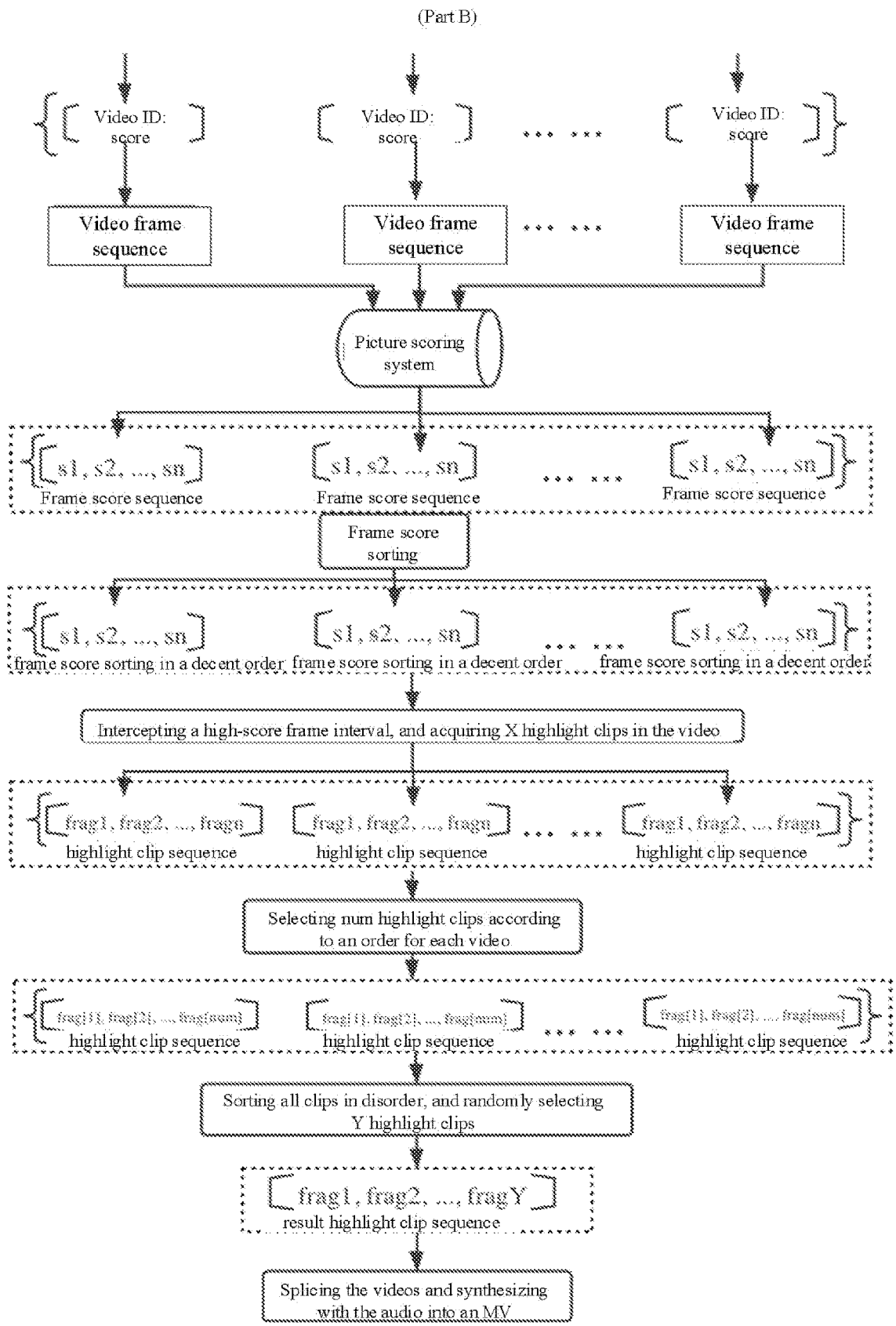

FIG. 4A and FIG. 4B are schematic flow charts of a production method of multimedia work according to another embodiment of the present disclosure. FIG. 4A and FIG. 4B constitute a complete flow chart, FIG. 4A shows part A of the flow chart, FIG. 4B shows part B of the flow chart, and part B shown in FIG. 4B is a part of the flow chart after part A shown in FIG. 4A. As shown in FIG. 4A and FIG. 4B, the method includes:

firstly, searching for an original video in a local album by obtaining access permission of the user terminal to the album, performing frame extraction on each original video to obtain a frame sequence corresponding to each original video (also referred to as a video frame sequence), and setting a unique identifier, namely a video ID, corresponding to each frame sequence;

inputting the frame sequence into the pre-trained video understanding model for video understanding analysis, and obtaining a video understanding feature, that is, a video feature result vector, output by the video understanding model;

meanwhile, downloading the target audio according to an audio Uniform Resource Locator (URL), that is, an audio download address on the Internet;

obtaining an audio feature of the target audio, inputting the audio feature into the pre-trained audio understanding model for audio understanding analysis, and obtaining an audio understanding feature, that is, an audio feature result vector, output by the audio understanding model;

next, inputting the audio understanding feature vector (that is, the audio feature result vector) and the video feature result vector into the pre-trained matching model (i.e., the scoring system) to predict a matching degree, and obtaining a matching degree of the audio understanding feature vector and each video feature result vector;

sorting the video frame sequence in a descending order of the matching degrees, and taking the first preset number of video frame sequences ranking in the top order as target video frame sequence(s);

calculating image quality of each picture in the target video frame sequence(s), sorting the pictures in a descending order of image quality, and taking the second preset number of pictures ranking in the top order as the target pictures, these target pictures constitute a highlight clip sequence in each video frame sequence.

Arranging the highlight clip sequence of each video frame sequence in disorder; randomly selecting Y pictures as a result highlight clip sequence, synthesizing the result highlight clip sequence into a video, and synthesizing the video with the target audio, to obtain a multimedia work.

Figure 5:
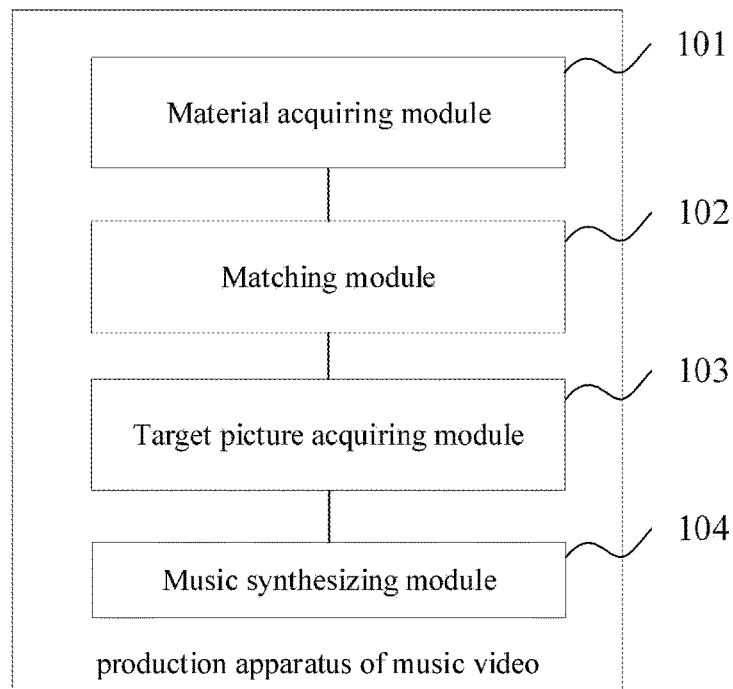
FIG. 5 is a production apparatus of multimedia work provided by an embodiment of the present disclosure.

An embodiment of the present disclosure provides a production apparatus of multimedia work; and as shown in FIG. 5, the production apparatus of multimedia work may include: a material acquiring module 101, a matching module 102, a target picture acquiring module 103 and a music synthesizing module 104.

The material acquiring module 101 is configured to acquire a target audio and at least one piece of multimedia information, and the at least one piece of multimedia information includes at least one selected from the group consisting of a picture or a video.

The matching module 102 is configured to determine a matching degree between the target audio and each of the at least one piece of multimedia information to obtain at least one matching degree, sort the at least one piece of multimedia information in a descending order of the at least one matching degree, and take a first preset number of pieces of multimedia information ranking in the top order as target multimedia information.

The target picture acquiring module 103 is configured to determine image quality of each picture in the target multimedia information, sort each picture in the target multimedia information in a descending order of image quality, and take a second preset number of pictures ranking in the top order as target pictures.

The music synthesizing module 104 is configured to synthesize a multimedia work according to the target pictures and the target audio.

The production apparatus of multimedia work provided by the embodiments of the present disclosure specifically implements the flow of the above-described production method of multimedia work; the content of the above-described production method of multimedia work may be referred to for details, and no details will be repeated here. The production apparatus of multimedia work provided by the embodiments of the present disclosure, by acquiring a target audio and at least one piece of multimedia information, and by calculating the matching degree between the target audio and the multimedia information, the target multimedia information matching with the target audio are obtained, so as to ensure that pictures to be further screened subsequently are all materials matching with the target audio; and then, calculating image quality of each picture in the target multimedia information, selecting pictures with high image quality from the target multimedia information, and synthesizing the pictures with high image quality with the target audio, to obtain a multimedia work, which reduces time cost and learning cost of a user in clipping and editing the video.

On the basis of the above-described respective embodiments, as an optional embodiment, the music synthesizing module is configured to select the third preset number of pictures from the target pictures to be synthesized with the target audio, to obtain a multimedia work.

On the basis of the above-described respective embodiments, as an optional embodiment, the matching module includes a matching degree calculating sub-module, the matching degree calculating sub-module is configured to determine a matching degree between the target audio and the at least one piece of multimedia information; and the matching degree calculating sub-module includes:

an audio understanding unit, configured to acquire an audio feature of the target audio, input the audio feature into an audio understanding model that is pre-trained, and obtain an audio understanding feature of the target audio output by the audio understanding model;

a video understanding unit, configured to perform frame extraction on the multimedia information, input a frame extraction result into a video understanding model that is pre-trained, and obtain a video understanding feature of the multimedia information output by the video understanding model;

a matching degree determining unit, configured to input the video understanding feature of each of the at least one piece of multimedia information and the audio understanding feature into a matching model that is pre-trained, to obtain a matching degree between the audio understanding feature and each video understanding feature output by the matching model, as at least one matching degree between the target audio and the at least one piece of multimedia information.

On the basis of the above-described respective embodiments, as an optional embodiment, the audio understanding model includes a first feature extraction layer and a first classification layer.

The matching degree calculating sub-module further includes an audio understanding training unit configured to train the audio understanding model; and the audio understanding training unit further includes:

a first parameter initializing sub-unit, configured to initialize parameters of the first feature extraction layer and the first classification layer;

a first feature acquiring sub-unit, configured to take a certain number of pieces of sample music as training samples, for each piece of sample music, take a music type of the sample music as a sample label, input the training sample and the sample label into the first feature extraction layer, and obtain an audio understanding feature of the training sample output by the first feature extraction layer;

a first prediction result acquiring sub-unit, configured to input the audio understanding feature of the training sample into the first classification layer, to obtain a prediction result of the music type of the training sample output by the first classification layer;

a first feedback sub-unit, configured to calculate a deviation between the prediction result and the sample label corresponding to the training sample, and adjust the parameters of the first feature extraction layer and the first classification layer through reverse feedback, until a convergence degree of the deviation is less than a preset threshold, so as to obtain the audio understanding model having been trained.

On the basis of the above-described respective embodiments, as an optional embodiment, the audio understanding unit performs the operation of obtaining the audio understanding feature of the music output by the audio understanding model, includes the following steps: inputting the music into the audio understanding model, and obtaining the audio understanding feature of the music output by the first feature extraction layer of the audio understanding model.

On the basis of the above-described respective embodiments, as an optional embodiment, the matching degree calculating sub-module further includes a video understanding training unit configured to train the video understanding model; and the video understanding training unit further includes:
- a transfer model acquiring sub-unit, configured to transfer the trained initial model, and adjust the parameter and the structure of the initial model in combination with the frame extraction result of the sample multimedia information, to obtain a transfer model;
- a model training sub-unit, configured to train the transfer learning model by using the back propagation method, according to the frame extraction result of the sample multimedia information and the theme of the sample multimedia information, and take the trained transfer learning model as the video understanding model.

On the basis of the above-described respective embodiments, as an optional embodiment, the video understanding model includes a second feature extraction layer and a second classification layer;

The model training sub-unit further includes:
- a second parameter initializing sub-unit, configured to initialize parameters of the second feature extraction layer and the second classification layer;
- a second feature acquiring sub-unit, configured to take the frame extraction result of the sample multimedia information as the training sample, take the theme of the sample multimedia information as the sample label, input the training sample and the sample label into the second feature extraction layer, and obtain a video understanding feature of the training sample output by the second feature extraction layer;
- a second prediction result acquiring sub-unit, configured to input the video understanding feature of the training sample into the second classification layer to obtain a prediction result of the theme of the training sample output by the second classification layer;
- a second feedback sub-unit, configured to calculate a deviation between the prediction result and the sample label corresponding to the training sample, and adjust the parameters of the second feature extraction layer and the second classification layer through reverse feedback, until a convergence degree of the deviation is less than a preset threshold, so as to obtain the transfer learning model having been trained.

On the basis of the above-described respective embodiments, as an optional embodiment, the video understanding unit performs a step of obtaining a video understanding feature of the multimedia information output by the video understanding model, includes the following step: inputting the frame extraction result into the video understanding model, to obtain the video understanding feature of the multimedia information output by the second feature extraction layer of the video understanding model.

On the basis of the above-described respective embodiments, as an optional embodiment, the target picture acquiring module calculates image quality of each picture in the target multimedia information, including: inputting the target picture into the pre-trained image quality prediction model, to obtain image quality of the target picture output by the image quality prediction model.

The target picture acquiring module includes an image quality model predicting module configured to train the image quality prediction model; and the image quality model predicting module further includes:
- a parameter initializing unit, configured to initialize a parameter of the image quality prediction model;
- a prediction result acquiring unit, configured to take a certain number of sample pictures as training samples, take image quality scores of a sample pictures as sample label, and input the training samples into the image quality prediction model, to obtain prediction results of the image quality scores of the training samples output by the image quality prediction model;
- a feedback adjusting unit, configured to calculate a deviation between a first difference and a second difference, and the first difference is a difference between prediction results of image quality scores of any two training samples, and the second difference is a difference between sample labels corresponding to the any two training samples; adjusting the parameter of the image quality prediction model through reverse feedback, until a convergence degree of the deviation is less than a preset threshold, so as to obtain the image quality prediction model having been trained.

An embodiment of the present disclosure provides an electronic device; and the electronic device includes: a memory and a processor; and at least one program, stored in the memory, and when executed by the processor, as compared with the prior art, configured to implement: acquiring a target audio and at least one piece of multimedia information, calculating a matching degree between the target audio and each multimedia information, obtaining the target multimedia information matching with the target audio, so as to ensure that pictures to be further screened subsequently are all materials matching with the target audio; and then, calculating image quality of each picture in the target multimedia information, selecting a picture with high image quality from the target multimedia information, and synthesizing the picture with high image quality with the target audio, to obtain a multimedia work, so that the multimedia work with high image quality that has the image content matching with the background music may be obtained, which reduces time cost and learning cost of a user in clipping and editing the video.

Figure 6:
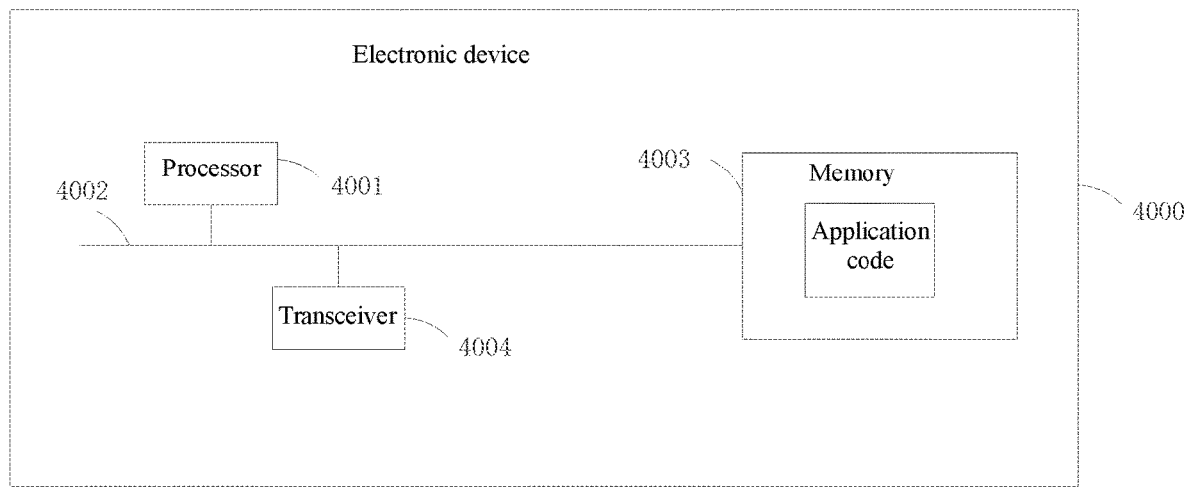
FIG. 6 is a structural schematic diagram of an electronic device provided by an embodiment of the present disclosure.

An electronic device is provided in an optional embodiment, and as shown in FIG. 6, the electronic device 4000 shown in FIG. 6 includes: a processor 4001 and a memory 4003. The processor 4001 and the memory 4003 are connected with each other, for example, through a bus 4002. Optionally, the electronic device 4000 may further include a transceiver 4004. It should be noted that in practical application, the transceiver 4004 is not limited to one, and the structure of the electronic device 4000 does not constitute limitation of the embodiments of the present disclosure.

The processor 4001 may be a Central Processing Unit (CPU), a general-purpose processor, a Digital Signal Processor (DSP), an Application Specific Integrated Circuit (ASIC), a Field Programmable Gate Array (FPGA) or other programmable logic devices, transistor logic devices, hardware components or any combination thereof. It may implement or execute various exemplary logic blocks, modules, and circuits described in conjunction with the disclosure of the present application. The processor 4001 may also be a combination to implement computing functions, for example, a combination including one or more microprocessors, a combination of a DSP and a microprocessor, etc.

The bus 4002 may include a path for transmitting information between the above-described components. The bus 4002 may be a Peripheral Component Interconnect (PCI) bus or an Extended Industry Standard Architecture (EISA) bus, etc. The bus 4002 may be divided into an address bus, a data bus, a control bus, etc. For ease of representation, only one bold line is used in FIG. 6 for representation, but it does not mean that there is only one bus or one type of bus.

The memory 4003 may be a Read-Only Memory (ROM) or other types of static storage devices that can store static information and instructions, a Random Access Memory (RAM) or other types of dynamic storage devices that can store information and instructions, or may also be Electrically Erasable Programmable Read-only Memory (EEPROM), Compact Disc Read-Only Memory (CD-ROM) or other CD memory, optical disc memory (including compact discs, laser discs, optical discs, digital versatile discs, Blu-ray discs, etc.), magnetic disk storage media or other magnetic storage devices, or may also be any other medium that can be used to carry or store desired program codes in a form of instruction or data structure and can be accessed by a computer, but not limited thereto.

The memory 4003 is configured to store the application code executing the solution of the application, which is controlled by the processor 4001 for execution. The processor 4001 is configured to execute the application code stored in the memory 4003, so as to implement the content shown in the foregoing method embodiments.

An embodiment of the present disclosure provides a computer-readable storage medium; the computer-readable storage medium has a computer program stored thereon, which, when running on a computer, makes the computer execute the corresponding content in the foregoing method embodiments. As compared with the prior art, by acquiring a target audio and at least one piece of multimedia information, and by calculating a matching degree between the target audio and each multimedia information, the target multimedia information matching with the target audio is obtained, so as to ensure that pictures to be further screened subsequently are all materials matching the target audio; and then, calculating image quality of each picture in the target multimedia information, selecting pictures with high image quality from the target multimedia information, and synthesizing the pictures with high image quality with the target audio, so as to obtain a multimedia work with high image quality that has the image content matching with the background music, which reduces time cost and learning cost of a user in clipping and editing the video.

It should be understood that although the steps in the flowchart of the drawings are shown in sequence as indicated by arrows, these steps are not necessarily executed in sequence as indicated by arrows. Unless explicitly stated in this text, the execution of these steps is not strictly limited in order, and it can be executed in other order. Moreover, at least a part of the steps in the flowchart of the figure may include a plurality of sub-steps or stages. These sub-steps or stages are not necessarily completed at the same time, but can be executed at different times, and the execution order is not necessarily sequential, but can be executed alternately or alternatively with other steps or at least a part of sub-steps or stages of other steps.

The above are only some embodiments of the present disclosure. It should be pointed out that for those of ordinary skill in the technical field, several improvements and embellishments can be made without departing from the principle of the present invention. These improvements and embellishments should also be regarded as the protection scope of the present invention.

The present disclosure provides a production method of multimedia work. The production method includes:
  acquiring a target audio and at least one piece of multimedia information, and the at least one piece of multimedia information includes at least one selected from the group consisting of a picture or a video;
  determining a matching degree between the target audio and each of the at least one piece of multimedia information to obtain at least one matching degree, sorting the at least one piece of multimedia information in an order of the at least one matching degree from high to low, and taking a first preset number of pieces of multimedia information ranking in top order as target multimedia information;
  determining image quality of each picture in the target multimedia information, sorting each picture in the target multimedia information in an order of the image quality of each picture from high to low, and taking a second preset number of pictures ranking in top order as target pictures;
  synthesizing a multimedia work according to the target pictures and the target audio.

Further, synthesizing a multimedia work according to the target pictures and the target audio, includes:
  selecting a third preset number of pictures from the target pictures to be synthesized with the target audio, to obtain the multimedia work.

Further, determining a matching degree between the target audio and each of the at least one multimedia information, includes:
  acquiring an audio feature of the target audio, inputting the audio feature into an audio understanding model that is pre-trained, and obtaining an audio understanding feature of the target audio output by the audio understanding model;
  performing frame extraction on the at least one multimedia information, inputting a frame extraction result into a video understanding model that is pre-trained, and obtaining a video understanding feature of each of the at least one multimedia information output by the video understanding model;
  inputting the audio understanding feature and the video understanding feature of each of the at least one piece of multimedia information into a matching model that is pre-trained, to obtain a matching degree between the audio understanding feature and the video understanding feature output by the matching model, as the at least one matching degree between the target audio and the at least one piece of multimedia information.

Further, the audio understanding model includes a first feature extraction layer and a first classification layer;
a method for training the audio understanding model includes:
initializing parameters of the first feature extraction layer and the first classification layer;
taking audio features of a certain number of pieces of sample music as training samples, taking a music type of each sample music as a sample label, for each training sample, inputting the training sample and the sample label into the first feature extraction layer, and obtaining an audio understanding feature of the training sample output by the first feature extraction layer;

inputting the audio understanding feature of the training sample into the first classification layer, to obtain a prediction result of a music type of the training sample output by the first classification layer;

calculating a deviation between the prediction result and the sample label corresponding to the training sample, and adjusting the parameters of the first feature extraction layer and the first classification layer through reverse feedback, until a convergence degree of the deviation is less than a preset threshold, so as to obtain the audio understanding model that has been trained.

Further, obtaining an audio understanding feature of a piece of music output by the audio understanding model, includes:

inputting the piece of music into the audio understanding model and obtaining the audio understanding feature of the piece of music output by the first feature extraction layer of the audio understanding model.

Further, a method for training the video understanding model includes:

transferring an initial model that has been trained, and adjusting a parameter and structure of the initial model in combination with a frame extraction result of sample multimedia information to obtain a transfer learning model;

according to a back propagation method, training the transfer learning model by using the frame extraction result of the sample multimedia information and a theme of the sample multimedia information, and taking the transfer learning model that has been trained as the video understanding model.

Further, the video understanding model includes a second feature extraction layer and a second classification layer;

training the transfer learning model by using the frame extraction result of the sample multimedia information and a theme of the sample multimedia information, according to a back propagation method, includes:

initializing parameters of the second feature extraction layer and the second classification layer;

taking the frame extraction result of the sample multimedia information as a training sample, taking the theme of the sample multimedia information as a sample label, inputting the training sample and the sample label into the second feature extraction layer, and obtaining a video understanding feature of the training sample output by the second feature extraction layer;

inputting the video understanding feature of the training sample into the second classification layer, to obtain a prediction result of the theme of the training sample output by the second classification layer;

calculating a deviation between the prediction result and the sample label corresponding to the training sample, and adjusting the parameters of the second feature extraction layer and the second classification layer through reverse feedback, until a convergence degree of the deviation is less than a preset threshold, so as to obtain the transfer learning model that has been trained.

Further, inputting a frame extraction result into a video understanding model that is pre-trained, and obtaining a video understanding feature of the multimedia information output by the video understanding model, includes:

inputting the frame extraction result into the video understanding model, to obtain the video understanding feature of the multimedia information output by the second feature extraction layer of the video understanding model.

Further, determining image quality of each picture in the target multimedia information, includes:

inputting the target pictures into an image quality prediction model that is pre-trained, to obtain image quality of the target pictures output by the image quality prediction model.

Further, a method for training the image quality prediction model includes:

initializing a parameter of the image quality prediction model;

taking a certain number of sample pictures as training samples, taking image quality scores of the sample pictures as sample labels, inputting the training samples into the image quality prediction model to obtain prediction results of the image quality scores of the training samples output by the image quality prediction model;

calculating a deviation between a first difference and a second difference, wherein the first difference is a difference between prediction results of image quality scores of any two training samples, and the second difference is a difference between sample labels corresponding to the any two training samples; and adjusting the parameter of the image quality prediction model through reverse feedback, until a convergence degree of the deviation is less than a preset threshold, so as to obtain the image quality prediction model that has been trained.

The present disclosure provides a production apparatus of multimedia work, includes:

a material acquiring module, configured to acquire a target audio and at least one piece of multimedia information, wherein the at least one piece of multimedia information comprises at least one selected from the group consisting of a picture or a video;

a matching module, configured to determine a matching degree between the target audio and each of the at least one piece of multimedia information to obtain at least one matching degree, sorting the at least one piece of multimedia information in an order of the at least one matching degree from high to low, and taking a first preset number of pieces of multimedia information ranking in top order as target multimedia information;

a target picture acquiring module, configured to determine image quality of each picture in the target multimedia information, sort each picture in the target multimedia information in an order of the image quality of each picture from high to low, and take a second preset number of pictures ranking in top order as target pictures; and a music synthesizing module, configured to synthesize a multimedia work according to the target pictures and the target audio.

Further, the music synthesizing module is specifically configured to: select a third preset number of pictures from the target pictures to be synthesized with the target audio, to obtain the multimedia work.

Further, the matching module includes a matching degree calculating sub-module configured to determine a matching degree between the target audio and each of the at least one piece of multimedia information to obtain at least one matching degree, the matching degree calculating sub-module includes:

an audio understanding unit, configured to acquire an audio feature of the target audio, input the audio feature into an audio understanding model that is pre-trained, and obtain an audio understanding feature of the target audio output by the audio understanding model;

an video understanding unit, configured to perform frame extraction on the at least one multimedia information, input a frame extraction result into a video understanding model that is pre-trained, and obtain a video understanding feature of each of the at least one multimedia information output by the video understanding model;

a matching degree determining unit, configured to input the audio understanding feature and the video understanding feature of each of the at least one piece of multimedia information into a matching model that is pre-trained, obtain a matching degree between the audio understanding feature and the video understanding feature output by the matching model, as the at least one matching degree between the target audio and the at least one piece of multimedia information.

Further, the audio understanding model includes a first feature extraction layer and a first classification layer;

The matching degree calculating sub-module further includes an audio understanding training unit configured to train the audio understanding model; and the audio understanding training unit further includes:

a first parameter initializing sub-unit, configured to initialize parameters of the first feature extraction layer and the first classification layer;

a first feature acquiring sub-unit, configured to take audio features of a certain number of pieces of sample music as training samples, taking a music type of each sample music as a sample label, for each training sample, inputting the training sample and the sample label into the first feature extraction layer, and obtaining an audio understanding feature of the training sample output by the first feature extraction layer;

a first prediction result acquiring sub-unit, configured to input the audio understanding feature of the training sample into the first classification layer, obtain a prediction result of a music type of the training sample output by the first classification layer;

a first feedback sub-unit, configured to calculate a deviation between the prediction result and the sample label corresponding to the training sample, and adjusting the parameters of the first feature extraction layer and the first classification layer through reverse feedback, until a convergence degree of the deviation is less than a preset threshold, so as to obtain the audio understanding model that has been trained.

Further, the audio understanding unit includes following step when obtaining an audio understanding feature of a piece of music output by the audio understanding model: inputting the piece of music into the audio understanding model and obtaining the audio understanding feature of the piece of music output by the first feature extraction layer of the audio understanding model.

Further, the matching degree calculating sub-module further includes a video understanding training unit configured to train the video understanding model; and the video understanding training unit further includes:

a transfer model acquiring sub-unit, configured to transfer an initial model that has been trained, and adjust a parameter and structure of the initial model in combination with a frame extraction result of sample multimedia information to obtain a transfer learning model;

a model training sub-unit, configured to train the transfer learning model by using the frame extraction result of the sample multimedia information and a theme of the sample multimedia information, according to a back propagation method, and take the transfer learning model that has been trained as the video understanding model.

Further, the video understanding model includes a second feature extraction layer and a second classification layer;

The model training sub-unit further includes:

a second parameter initializing sub-unit, configured to initialize parameters of the second feature extraction layer and the second classification layer;

a second feature acquiring sub-unit, configured to take the frame extraction result of the sample multimedia information as a training sample, take the theme of the sample multimedia information as a sample label, input the training sample and the sample label into the second feature extraction layer, and obtain a video understanding feature of the training sample output by the second feature extraction layer;

a second prediction result acquiring sub-unit, configured to input the video understanding feature of the training sample into the second classification layer, to obtain a prediction result of the theme of the training sample output by the second classification layer;

a second feedback sub-unit, configured to calculate a deviation between the prediction result and the sample label corresponding to the training sample and adjust the parameters of the second feature extraction layer and the second classification layer through reverse feedback, until a convergence degree of the deviation is less than a preset threshold, so as to obtain the transfer learning model that has been trained.

Further, the video understanding unit performs a step of obtaining a video understanding feature of the multimedia information output by the video understanding model, includes the following step: inputting the frame extraction result into the video understanding model, to obtain the video understanding feature of the multimedia information output by the second feature extraction layer of the video understanding model.

Further, the target picture acquiring module calculates image quality of each picture in the target multimedia information, including: inputting the target pictures into an image quality prediction model that is pre-trained, to obtain image quality of the target pictures output by the image quality prediction model.

The target picture acquiring module includes an image quality model predicting module configured to train the image quality prediction model; and the image quality model predicting module further includes:

a parameter initializing unit, configured to initialize a parameter of the image quality prediction model;

a prediction result acquiring unit, configured to take a certain number of sample pictures as training samples, take image quality scores of the sample pictures as sample labels, inputting the training samples into the image quality prediction model to obtain prediction results of the image quality scores of the training samples output by the image quality prediction model;

a feedback adjusting unit, configured to calculate a deviation between a first difference and a second difference, wherein the first difference is a difference between prediction results of image quality scores of any two training samples, and the second difference is a difference between sample labels corresponding to the any two training samples; and adjust the parameter of the image quality prediction model through reverse feedback, until a convergence degree of the deviation is less than a preset threshold, so as to obtain the image quality prediction model that has been trained.

What is claimed is:

1. A production method of multimedia work, comprising:
acquiring a target audio and at least one piece of multimedia information, wherein the at least one piece of multimedia information comprises at least one selected from the group consisting of a picture or a video;
determining a matching degree between the target audio and each of the at least one piece of multimedia information to obtain at least one matching degree, sorting the at least one piece of multimedia information in an order of the at least one matching degree from high to low, and taking a first preset number of pieces of multimedia information ranking in top order as target multimedia information;
determining image quality of each picture in a target multimedia information, sorting each picture in the target multimedia information in an order of the image quality of each picture from high to low, and taking a second preset number of pictures ranking in top order as target pictures;
synthesizing a multimedia work according to the target pictures and the target audio,
wherein the determining image quality of each picture in the target multimedia information, comprises:
inputting the target pictures into an image quality prediction model that is pre-trained, to obtain image quality of the target pictures output by the image quality prediction model.

2. The production method of multimedia work according to claim 1, wherein the synthesizing a multimedia work according to the target pictures and the target audio, comprises:
selecting a third preset number of pictures from the target pictures to be synthesized with the target audio, to obtain the multimedia work.

3. The production method of multimedia work according to claim 1, wherein the determining a matching degree between the target audio and each of the at least one piece of multimedia information to obtain at least one matching degree, comprises:
acquiring an audio feature of the target audio, inputting the audio feature into an audio understanding model that is pre-trained, and obtaining an audio understanding feature of the target audio output by the audio understanding model;
performing frame extraction on the at least one multimedia information, inputting a frame extraction result into a video understanding model that is pre-trained, and obtaining a video understanding feature of each of the at least one multimedia information output by the video understanding model;
inputting the audio understanding feature and the video understanding feature of each of the at least one piece of multimedia information into a matching model that is pre-trained, to obtain a matching degree between the audio understanding feature and the video understanding feature output by the matching model, as the at least one matching degree between the target audio and the at least one piece of multimedia information.

4. The production method of multimedia work according to claim 2, wherein the determining a matching degree between the target audio and each of the at least one piece of multimedia information to obtain at least one matching degree, comprises:
acquiring an audio feature of the target audio, inputting the audio feature into an audio understanding model that is pre-trained, and obtaining an audio understanding feature of the target audio output by the audio understanding model;
performing frame extraction on the at least one multimedia information, inputting a frame extraction result into a video understanding model that is pre-trained, and obtaining a video understanding feature of each of the at least one multimedia information output by the video understanding model;
inputting the audio understanding feature and the video understanding feature of each of the at least one piece of multimedia information into a matching model that is pre-trained, to obtain a matching degree between the audio understanding feature and the video understanding feature output by the matching model, as the at least one matching degree between the target audio and the at least one piece of multimedia information.

5. The production method of multimedia work according to claim 3, wherein the audio understanding model comprises a first feature extraction layer and a first classification layer;
a method for training the audio understanding model comprises:
initializing parameters of the first feature extraction layer and the first classification layer;
taking audio features of a certain number of pieces of sample music as training samples, taking a music type of each sample music as a sample label, for each training sample, inputting the training sample and the sample label into the first feature extraction layer, and obtaining an audio understanding feature of the training sample output by the first feature extraction layer;
inputting the audio understanding feature of the training sample into the first classification layer, to obtain a prediction result of a music type of the training sample output by the first classification layer;
calculating a deviation between the prediction result and the sample label corresponding to the training sample, and adjusting the parameters of the first feature extraction layer and the first classification layer through reverse feedback, until a convergence degree of the deviation is less than a preset threshold, so as to obtain the audio understanding model that has been trained.

6. The production method of multimedia work according to claim 5, wherein the obtaining an audio understanding feature of a piece of music output by the audio understanding model, comprises:
inputting the piece of music into the audio understanding model and obtaining the audio understanding feature of the piece of music output by the first feature extraction layer of the audio understanding model.

7. The production method of multimedia work according to claim 3, wherein a method for training the video understanding model comprises:
transferring an initial model that has been trained, and adjusting a parameter and structure of the initial model in combination with a frame extraction result of sample multimedia information to obtain a transfer learning model;
according to a back propagation method, training the transfer learning model by using the frame extraction result of the sample multimedia information and a theme of the sample multimedia information, and taking the transfer learning model that has been trained as the video understanding model.

8. The production method of multimedia work according to claim 4, wherein a method for training the video understanding model comprises:
- transferring an initial model that has been trained, and adjusting a parameter and structure of the initial model in combination with a frame extraction result of sample multimedia information to obtain a transfer learning model;
- according to a back propagation method, training the transfer learning model by using the frame extraction result of the sample multimedia information and a theme of the sample multimedia information, and taking the transfer learning model that has been trained as the video understanding model.

9. The production method of multimedia work according to claim 5, wherein a method for training the video understanding model comprises:
- transferring an initial model that has been trained, and adjusting a parameter and structure of the initial model in combination with a frame extraction result of sample multimedia information to obtain a transfer learning model;
- according to a back propagation method, training the transfer learning model by using the frame extraction result of the sample multimedia information and a theme of the sample multimedia information, and taking the transfer learning model that has been trained as the video understanding model.

10. The production method of multimedia work according to claim 7, wherein the video understanding model comprises a second feature extraction layer and a second classification layer;
- the training the transfer learning model by using the frame extraction result of the sample multimedia information and a theme of the sample multimedia information, according to a back propagation method, comprises:
- initializing parameters of the second feature extraction layer and the second classification layer;
- taking the frame extraction result of the sample multimedia information as a training sample, taking the theme of the sample multimedia information as a sample label, inputting the training sample and the sample label into the second feature extraction layer, and obtaining a video understanding feature of the training sample output by the second feature extraction layer;
- inputting the video understanding feature of the training sample into the second classification layer, to obtain a prediction result of the theme of the training sample output by the second classification layer;
- calculating a deviation between the prediction result and the sample label corresponding to the training sample and adjusting the parameters of the second feature extraction layer and the second classification layer through reverse feedback, until a convergence degree of the deviation is less than a preset threshold, so as to obtain the transfer learning model that has been trained.

11. The production method of multimedia work according to claim 10, wherein the inputting a frame extraction result into a video understanding model that is pre-trained, and obtaining a video understanding feature of the multimedia information output by the video understanding model, comprises:
- inputting the frame extraction result into the video understanding model, to obtain the video understanding feature of the multimedia information output by the second feature extraction layer of the video understanding model.

12. The production method of multimedia work according to claim 11, wherein a method for training the image quality prediction model comprises:
- initializing a parameter of the image quality prediction model;
- taking a certain number of sample pictures as training samples, taking image quality scores of the sample pictures as sample labels, inputting the training samples into the image quality prediction model to obtain prediction results of the image quality scores of the training samples output by the image quality prediction model;
- calculating a deviation between a first difference and a second difference, wherein the first difference is a difference between prediction results of image quality scores of any two training samples, and the second difference is a difference between sample labels corresponding to the any two training samples; and
- adjusting the parameter of the image quality prediction model through reverse feedback, until a convergence degree of the deviation is less than a preset threshold, so as to obtain the image quality prediction model that has been trained.

13. An electronic device, comprising a memory, a processor, and a computer program stored on the memory and executable on the processor, wherein the processor, when executing the computer program, implements a production method of multimedia work,
the production method of multimedia work comprises:
- acquiring a target audio and at least one piece of multimedia information, wherein the at least one piece of multimedia information comprises at least one selected from the group consisting of a picture or a video;
- determining a matching degree between the target audio and each of the at least one piece of multimedia information to obtain at least one matching degree, sorting the at least one piece of multimedia information in an order of the at least one matching degree from high to low, and taking a first preset number of pieces of multimedia information ranking in top order as target multimedia information;
- determining image quality of each picture in a target multimedia information, sorting each picture in the target multimedia information in an order of the image quality of each picture from high to low, and taking a second preset number of pictures ranking in top order as target pictures;
- synthesizing a multimedia work according to the target pictures and the target audio,
wherein the determining image quality of each picture in the target multimedia information, comprises:
- inputting the target pictures into an image quality prediction model that is pre-trained, to obtain image quality of the target pictures output by the image quality prediction model.

14. A non-transitory computer-readable storage medium, wherein a computer instruction is stored on the non-transitory computer-readable storage medium, the computer instruction, when executed by a processor, implements the steps of the production method of multimedia work according to claim 1.

15. The electronic device according to claim 13, wherein the determining a matching degree between the target audio and each of the at least one piece of multimedia information to obtain at least one matching degree, comprises:
- acquiring an audio feature of the target audio, inputting the audio feature into an audio understanding model that is pre-trained, and obtaining an audio understanding feature of the target audio output by the audio understanding model;

performing frame extraction on the at least one multimedia information, inputting a frame extraction result into a video understanding model that is pre-trained, and obtaining a video understanding feature of each of the at least one multimedia information output by the video understanding model;

inputting the audio understanding feature and the video understanding feature of each of the at least one piece of multimedia information into a matching model that is pre-trained, to obtain a matching degree between the audio understanding feature and the video understanding feature output by the matching model, as the at least one matching degree between the target audio and the at least one piece of multimedia information.

16. The electronic device according to claim 15, wherein the audio understanding model comprises a first feature extraction layer and a first classification layer;

a method for training the audio understanding model comprises:

initializing parameters of the first feature extraction layer and the first classification layer;

taking audio features of a certain number of pieces of sample music as training samples, taking a music type of each sample music as a sample label, for each training sample, inputting the training sample and the sample label into the first feature extraction layer, and obtaining an audio understanding feature of the training sample output by the first feature extraction layer;

inputting the audio understanding feature of the training sample into the first classification layer, to obtain a prediction result of a music type of the training sample output by the first classification layer;

calculating a deviation between the prediction result and the sample label corresponding to the training sample, and adjusting the parameters of the first feature extraction layer and the first classification layer through reverse feedback, until a convergence degree or the deviation is less than a preset threshold, so as to obtain the audio understanding model that has been trained.

17. The electronic device according to claim 15, wherein the processor, when executing the computer program, implements a method for training the video understanding model, the method for training the video understanding model comprises:

transferring an initial model that has been trained, and adjusting a parameter and structure of the initial model in combination with a frame extraction result of sample multimedia information to obtain a transfer learning model;

according to a back propagation method, training the transfer learning model by using the frame extraction result of the sample multimedia information and a theme of the sample multimedia information, and taking the transfer learning model that has been trained as the video understanding model.

18. The electronic device according to claim 13, wherein the synthesizing a multimedia work according to the target pictures and the target audio, comprises:

selecting a third preset number of pictures from the target pictures to be synthesized with the target audio, to obtain the multimedia work.

19. The electronic device according to claim 18, wherein the determining a matching degree between the target audio and each of the at least one piece of multimedia information to obtain at least one matching degree, comprises:

acquiring an audio feature of the target audio, inputting the audio feature into an audio understanding model that is pre-trained, and obtaining an audio understanding feature of the target audio output by the audio understanding model;

performing frame extraction on the at least one multimedia information, inputting a frame extraction result into a video understanding model that is pre-trained, and obtaining a video understanding feature of each of the at least one multimedia information output by the video understanding model;

inputting the audio understanding feature and the video understanding feature of each of the at least one piece of multimedia information into a matching model that is pre-trained, to obtain a matching degree between the audio understanding feature and the video understanding feature output by the matching model, as the at least one matching degree between the target audio and the at least one piece of multimedia information.

* * * * *